H. HAYASHI.
DEVICE FOR WRAPPING POTTED PLANTS.
APPLICATION FILED FEB. 15, 1916.

1,183,454.

Patented May 16, 1916.

WITNESS
Wm. G. Drew

INVENTOR.
Harry Hayashi
BY
ATTORNEYS.

UNITED STATES PATENT OFFICE.

HARRY HAYASHI, OF ELMHURST, CALIFORNIA.

DEVICE FOR WRAPPING POTTED PLANTS.

1,183,454. Specification of Letters Patent. Patented May 16, 1916.

Application filed February 15, 1916. Serial No. 78,515. REISSUED.

*To all whom it may concern:*

Be it known that I, HARRY HAYASHI, a subject of the Emperor of Japan, residing at Elmhurst, in the county of Alameda and State of California, have invented certain new and useful Improvements in Devices for Wrapping Potted Plants, of which the following is a specification.

The hereinafter described invention relates to a device for use in connection with flower nurseries, flower stores and stands for permitting the quick and efficient wrapping of potted plants without injury thereto.

During the holiday season it is required that potted plants sold be quickly wrapped for delivery to the customer, and the usual custom or rather the custom prevailing at this time is to wrap the flower or plant by surrounding the same with loose paper, the free edges or ends of which are either tied or pinned together. Owing to the delicate nature of the article being wrapped, great care must be exercised to avoid injury to the flowers of the plant and equally so to the small branches thereof, and to avoid stripping the leaves therefrom, and this requires that those to whom the wrapping of the potted plants are entrusted be skilled operators, for otherwise much injury will be done to the wrapped plant.

The essential objects of the present invention is to permit the use of experienced operators to be dispensed with and by so doing materially reducing the expense incident to the wrapping of the potted plants; to provide a device which will permit of inexperienced operators and, in fact, children to be employed for the wrapping of the plants for delivery; one which shall be simple of construction, efficient and inexpensive as to manufacture, and by means of which the plants may be quickly wrapped and the flowers and small branches thereof fully protected.

To comprehend the invention, reference should be had to the accompanying sheet of drawings, wherein—

Figure 1:
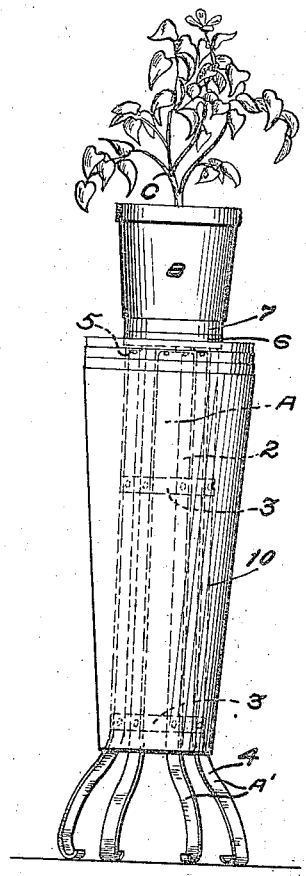
Figure 3:
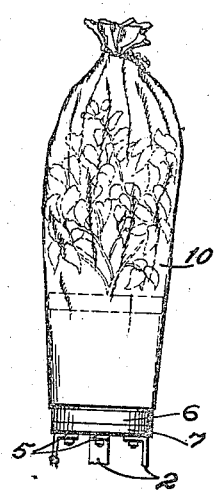
Figure 2:
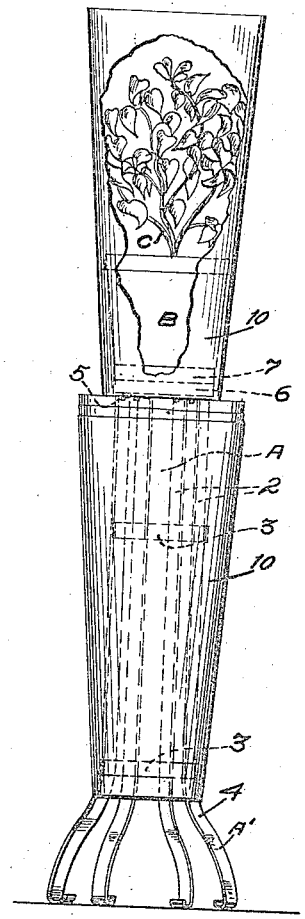

Figure 1 is a view of the wrapping stand with a potted plant supported thereon in position for wrapping, and the nested wrapping envelops in assembled position relative to the stand. Fig. 2 is a similar view illustrating one of the wrapping envelops partly broken away and removed from its nested position and raised to partly embrace the potted plant. Fig. 3 is a similar view illustrating the withdrawn wrapping envelop fully positioned with respect to the potted plant to inclose the same and the upper end thereof secured together for thorough protection of the wrapped plant.

Figure 4:
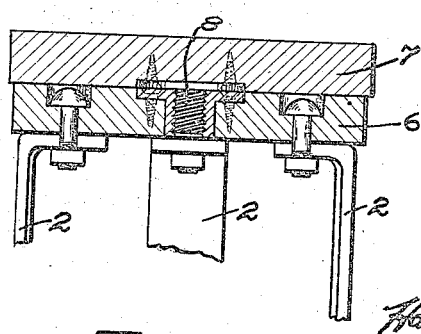

Fig. 4 is a broken detail view disclosing one manner of uniting the receiving platform to the stand.

In the drawings, the letter A is used to designate a stand constructed of any desired material and suitably shaped. In its preferred form, the said stand comprises a series of vertically disposed spaced legs 2, united one to the other throughout the length thereof by the spaced tie or brace members 3, and the lower end portion 4 of each leg 2 is gradually outwardly inclined to provide an enlarged base member A' for the said stand and to the upper inwardly flanged ends 5 of the legs 2 is united a head plate 6. There is thus formed a pedestal for the reception of potted plants to be wrapped, having sufficient rigidity to withstand hard usage and formed with a base member providing a solid, substantial support.

Due to the fact that flower pots vary in size, preference is given to the providing of a removable top 7 for the stand or pedestal A, so that different size tops may be utilized if required for pots of varying diameter. For this purpose the top 7 is provided with a threaded depending stud 8, which screws into a threaded socket plate 9 countersunk within the head plate 6. In case the top 7 should prove to be of a diameter too small or too large for the diameter of the flower pot to be placed thereon for the wrapping of the flower therein, said top 7 may be readily removed and a top of proper size secured to the pedestal. However, only in exceptional cases will it be required to utilize a substitute top, inasmuch as a top of standard size may be employed for all flower pots excepting those of unusual diameter.

Over the pedestal A is fitted a series of open bottom nested wrapping envelops 10, constructed of suitable wrapping material, preferably paper, and said package of nested envelops in the present case rest and is supported by the outwardly flared base member portion A' of the said pedestal, so that the nested envelops are situated within convenient reach of the operator engaged in the wrapping of the potted plants. These envelops are concial in shape and opened at top and bottom, the open bottom end of the envelops being lowermost relative to the platform of the pedestal, leaving the enlarged open end uppermost.

In the operation of wrapping the potted plants the greatest care must be exercised in preventing the breaking of the small branches, leaves and damaging the flowers, and they must be so wrapped that injury will not result to the plant while being transported from place to place or delivered by messengers. As before stated, with the rush of work during holiday seasons the wrapping of the plants must be rapidly performed and with the hand work of wrapping which requires the handling of the plants this work must be performed by skilled workmen.

With the present invention, a child or inexperienced workman can perform the work of wrapping as rapidly and more efficiently than an expert wrapper under the method of wrapping at present employed.

In carrying out the invention a nested series of wrapping envelops of the requisite size is placed over the pedestal or flower support to be in convenient reach of the operator. The potted plant to be wrapped is seated on the pot-rest or top 7. An operator then withdraws the first of the series of nested envelops and lifts the same upwardly until further movement thereof is arrested by the contact of the restricted portion thereof with the outer wall surface of the pot B, when the upper end of the conical shaped envelop will stand well above the top of the plant C to be wrapped. It is only then required that the person engaged in the work of wrapping draw together the upper open end of the envelop and tie the same in any suitable manner, the plant being then properly wrapped and ready for removal. Inasmuch as the envelops are of tapering form, it is obvious that as drawn upwardly to inclose the plant, the outstanding branches of the plant and the leaves thereof are gradually forced upwardly and drawn together, thus preventing the breaking thereof while at the same time placing the same in compact form. This manner of wrapping or packing the potted plants insures the keeping thereof in good condition after leaving the store until delivered to the customer, and permits the wrapping or packing of the plant in less time and in a more efficient manner than the hand work of wrapping a paper around the same, and again less material is utilized in the wrapping than is required under the old manner of wrapping, which is an item of importance where hundreds of potted plants are wrapped per day.

The described invention will readily appeal and commend itself to those conversant with the subject thereof and more particularly to that class of florists desiring to serve their customers in the best possible manner. Considering the time and material saved, the wrapped condition of the plant and the fact that inexperienced wrappers may be employed, the wrapping is more efficient and much cheaper than any of the methods at present employed.

While the preferred form of pedestal has been illustrated and described, any suitable form of constructed pedestal may be employed which will permit of receiving a stack or series of nested wrapping envelops capable of being successively removed and drawn upwardly to inclose a plant supported by the pedestal and to be wrapped.

Having thus described the invention what is claimed as new and desired to be protected by Letters Patent is:—

1. A device for the wrapping of potted plants, the same comprising a pedestal for receiving and supporting a potted plant to be wrapped, and a nested series of wrapping envelops fitted over said pedestal and adapted to be successively removed and upwardly drawn to inclose a plant to be wrapped.

2. A device for the wrapping of potted plants, the same comprising a pedestal for receiving and supporting a potted plant for wrapping provided with an enlarged base member, and a series of nested conical shaped open ended wrapping envelops fitted over said pedestal and supported by the base member thereof, said envelops adapted to be successively removed and drawn upwardly to inclose a plant to be wrapped.

3. A device for the wrapping of potted plants, the same comprising a pedestal for supporting a plant to be wrapped, a pot support removably secured to the upper end of said pedestal, and a series of nestled wrapping envelops fitted over the pedestal and adapted to be successively removed and upwardly drawn to inclose a plant to be wrapped.

4. A device for use in the wrapping of potted plants, the same comprising a supporting structure for receiving potted plants to be wrapped, and a series of nestled conical wrapping envelops fitted thereover and adapted to be successively removed and upwardly drawn to inclose the plant to be wrapped.

In testimony whereof I have signed my name to this specification in the presence of two subscribing witnesses.

HARRY HAYASHI.

Witnesses:
HARRY A. TOTTEN,
D. B. RICHARDS.